United States Patent
Liebherr et al.

(10) Patent No.: US 10,678,612 B2
(45) Date of Patent: Jun. 9, 2020

(54) EVENT MESSAGING SYSTEM FOR MULTI-CLOUD COMPUTING ENVIRONMENTS

(71) Applicant: SAP SE, Walldorf (DE)

(72) Inventors: Wolf Liebherr, Brushsal (DE);
Christian Gross, Sunnyvale, CA (US);
Sebastian Koehn, Dresden (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/167,187

(22) Filed: Oct. 22, 2018

(65) Prior Publication Data

US 2020/0125423 A1    Apr. 23, 2020

(51) Int. Cl.
*G06F 9/54* (2006.01)
*H04L 29/08* (2006.01)

(52) U.S. Cl.
CPC ............ *G06F 9/542* (2013.01); *G06F 9/545* (2013.01); *G06F 9/546* (2013.01); *H04L 67/1097* (2013.01); *G06F 2209/547* (2013.01); *G06F 2209/548* (2013.01)

(58) Field of Classification Search
CPC ................ G06F 9/4862; G06F 9/546

USPC .......................... 719/313, 314, 317
See application file for complete search history.

(56) References Cited

U.S. PATENT DOCUMENTS

| | | | |
|---|---|---|---|
| 9,798,882 B2 * | 10/2017 | Diehl | G06F 21/577 |
| 10,348,581 B2 * | 7/2019 | Maturana | |
| 2018/0191597 A1 * | 7/2018 | Nageshappa | H04L 43/08 |

* cited by examiner

*Primary Examiner* — Andy Ho
(74) *Attorney, Agent, or Firm* — Jones Day

(57) ABSTRACT

A system includes a cloud orchestration framework, a messaging interface and a plurality of cloud instances that each execute a respective messaging agent that transmits messages from the corresponding cloud instance to the messaging interface. Each of the cloud orchestration framework, messaging interface, and cloud instances respectively include at least one programmable data processor and memory storing instructions for execution by such at least one programmable data processor. The messages from each respective cloud instance have different message types corresponding to the operating system used by such cloud instance or an application-level event. In addition, the messaging interface queues the messages received from the cloud instances for processing by the cloud orchestration framework. Related apparatus, systems, techniques and articles are also described.

20 Claims, 3 Drawing Sheets

EVENT MESSAGING SYSTEM FOR MULTI-CLOUD COMPUTING ENVIRONMENTS

TECHNICAL FIELD

The subject matter described herein relates to a messaging system for use with multi-cloud computing environments that operates at the operating system and/or application level.

BACKGROUND

Computing architectures are increasingly utilizing cloud-based computing environments. In many cases, these cloud systems utilize different, heterogeneous operating systems. Events originating from these different operating systems may have an effect on the architecture as a whole necessitating their monitoring.

SUMMARY

In one aspect, a system includes a cloud orchestration framework, a messaging interface and a plurality of cloud instances that each execute a respective messaging agent that transmits messages from the corresponding cloud instance to the messaging interface. Each of the cloud orchestration framework, messaging interface, and cloud instances respectively include at least one programmable data processor and memory storing instructions for execution by such at least one programmable data processor. The messages from each respective cloud instance have different message types corresponding to the operating system used by such cloud instance or an application-level event. In addition, the messaging interface queues the messages received from the cloud instances for processing by the cloud orchestration framework.

The messages can include operating system level messages and/or application-level messages.

The cloud orchestration framework can include a plurality of messaging workers which are configured to process the messages in the message queue in the messaging interface. There can be a plurality of message queues providing redundant storage of messages for processing. At least a portion of the message queues can be in computing systems that are geographically disperse. The cloud orchestration framework can further include a cloud orchestration database for storing event related data generated by the messaging workers.

At least one of the messaging agents can include an application programming interface (API) binding for a corresponding messaging queue.

In another aspect, events are monitored at each of a plurality of cloud instances executing different types of operating systems. Event messages are then transmitted by respective messaging agents being executed by each of the cloud instances to a messaging interface. The messaging interface queues the messages in a message queue. Thereafter, the messages in the message queue are processed by a plurality of workers forming part of a cloud orchestration framework.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for enhanced architectures and processes for interacting with various types of cloud instances executing different types of operating system and application-level events.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
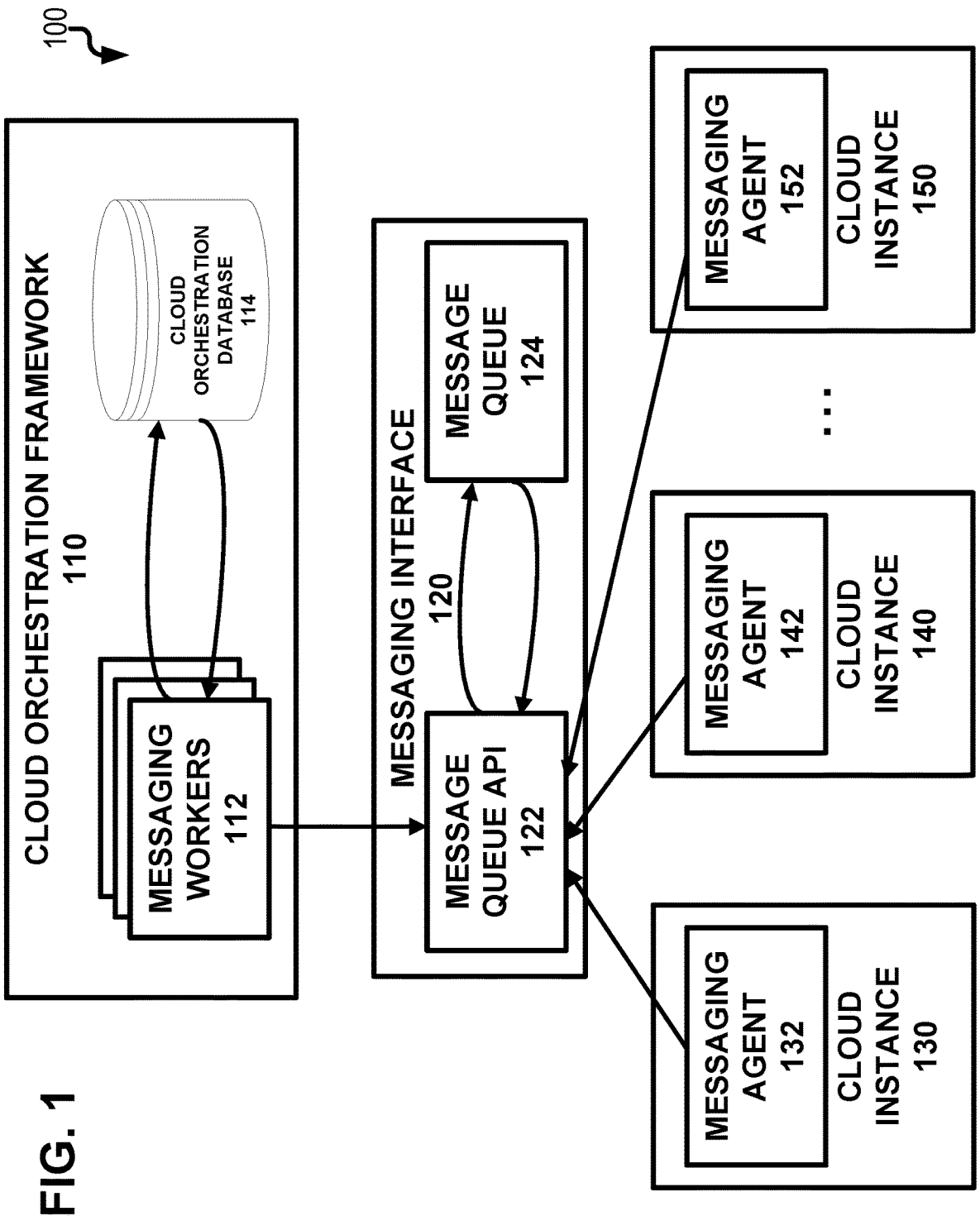
FIG. 1 is a system diagram illustrating a cloud orchestration framework interacting, via a messaging interface, with a plurality of cloud instances executing different types of operating systems.

FIG. 1 is a diagram 100 of a multi-cloud computing environment that includes a cloud orchestration framework 110, a messaging interface 120, and a plurality of cloud instances 130, 140, 150. Each of such components 110-150 can include one or more programmable data processors and memory storing instructions for execution by such processors. Stated differently, each of the components 110-150 can include various computing devices and in some cases storage devices. While there are three separate cloud instances 130, 140, 150 illustrated, it will be appreciated that there can be any number of cloud instances and that such cloud instances may have differing storage mechanisms, messaging mechanisms, and the like. The architecture of FIG. 1 is particularly useful with cloud instances 130, 140, 150 having different and heterogeneous operating systems.

The current subject matter provides a unified, central multi-cloud capable messaging system which can be used for addressing operating system (OS) level induced events and application-level originating from each of the cloud instances 130, 140, 150. For example, all events and messages related to taking OS-level backups can be transmitted to the cloud orchestration framework 110.

The cloud orchestration framework 110 can be characterized as a "single pane of glass" for managing the heterogeneous fleet of cloud instances 130, 140, 150 (e.g. physical servers or containers). The cloud orchestration framework 110 can include a plurality of messaging workers 112 and a cloud orchestration database 114. The messaging workers 112 interact with the message queue API 122. By adding more messaging workers 112, the overall throughput of the system can be increased. The cloud orchestration database 114 can store various types of information about events originating at the cloud instances 130, 140, 150. For example, the cloud orchestration database 114 can store data characterizing aspect to enable a single and unified alarm/incident/support ticket inbox and the like.

The messaging interface 120 can comprise a messaging queue (MQ) API 122 in combination with a message queue 124. The messaging interface 120 can, for example, include, such as RABBIT MQ or a cloud-based service such as Simple Queue Service (SQS) by AMAZON. The messaging interface 120 can also normalize the content and the handling of messages in such a way, that the underlying implementation details are shielded from the other components of the system.

Each cloud instance 130, 140, 150 can include a respective messaging agent 132, 142, 152 which causes certain messages to be sent to the messaging interface 120 via the MQ API 122 so that they can be queued in the MQ 124. Once in the MQ 124, the messages can be processed by one of the messaging workers 112 and, if certain information is present, the cloud orchestration database 114 can be accordingly updated.

Instead of implementing different notification rules and patterns on the cloud instance level, it is also possible to implement a central filtering on the messaging interface 120 level. This reduces the configuration complexity on the messaging agent 124 level; the agents can then simply forward all messages to the messaging interface 120.

One case for the multi-cloud OS-level messaging system of FIG. 1 is the coordination and signaling of backup-related events originating at the cloud instances 130, 140, 150. For example, whenever a scheduled backup was successfully executed or whenever it failed for a certain reason, the corresponding messaging agent 132, 142, 152 can relay this information in a structured message to the message queue 124, from where it can be securely retrieved and processed by the cloud orchestration framework 110. The structured message can include both event-related information as well as information specifying the origin of the message. As a result, the system of FIG. 1 can be used for processing "unstructured" data or data in unknown formats originating from the cloud instances 130, 140, 150, which can then be centrally collected/aggregated on a per-instance basis in the cloud orchestration database 114.

All involved messaging agents 132, 142, 152 are able to communicate securely with message queue API endpoints 122. In case the MQ API endpoints 122 reside in a private and strictly controlled network environment, anonymous credentials can be utilized. Alternatively, the required credentials can be deployed in a different fashion (e.g. by explicitly configuring them in the messaging agents 132, 142, 152 or by using IaaS-specific means such as using the Managed Service Identity available in the Azure environment, etc.).

Due to its nature, the system of FIG. 1 can be easily scaled to support a large number of instances by effectively decoupling the "Producer" from the "Consumer" side: If the number of messages within the central message queue 124 should get too high for a single messaging worker 112 in the cloud orchestration framework 110, other workers 112 can be launched in parallel to ensure the timely processing of messages.

The messaging interface 120 can be setup in a highly available manner. The system of FIG. 1 can also be arranged to ensure that messages cannot get lost, by requiring the messaging workers 112 in the cloud orchestration framework 110 to actively delete processed messages in the respective message queue 124.

Figure 2:
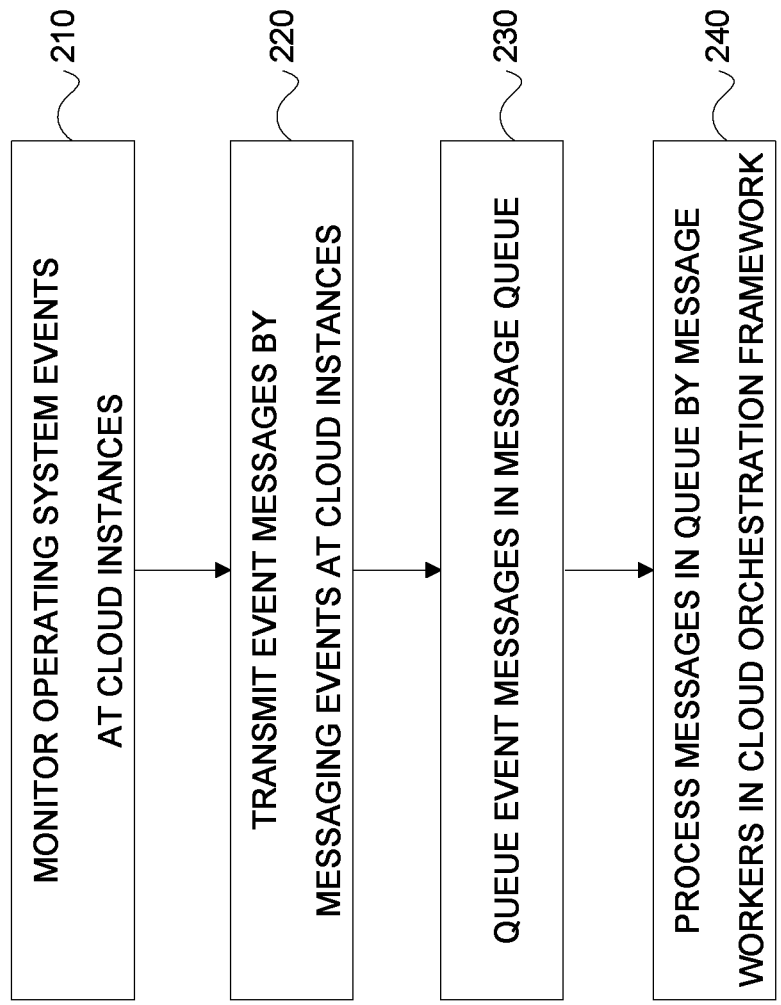
FIG. 2 is a process flow diagram illustrating the processing of operating system-level event messages from different types of cloud instances.

FIG. 2 is a process flow diagram 200 in which, at 210, operating system-level events are monitored at each of a plurality of cloud instances executing different types of operating systems. Thereafter, at 220, event messages are transmitted to a messaging interface by respective messaging agents being executed by each of the cloud instances. The message interface, at 230, queues the event messages in a message queue so that they can be processed, at 240, by a plurality of workers forming part of a cloud orchestration framework.

Figure 3:
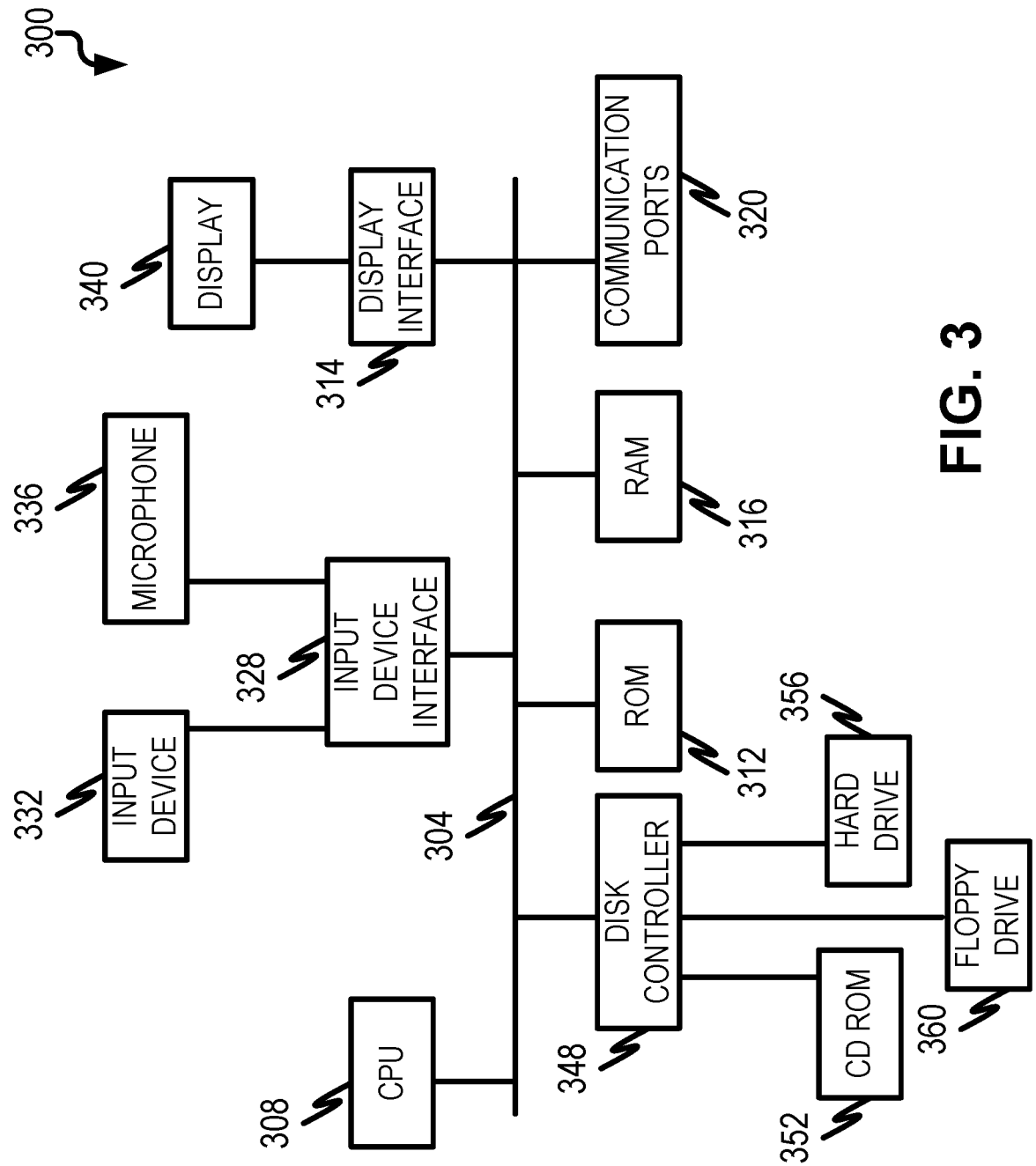
FIG. 3 is a computing device for implementing aspects described herein.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A system comprising:
a cloud orchestration framework;
a messaging interface having a single message queue that is accessible by a message queue application programming interface (API);
a plurality of cloud instances forming part of a multi-cloud computing environment that each execute a respective messaging agent that transmits messages from the corresponding cloud instance to the messaging interface;
wherein:
each of the cloud orchestration framework, messaging interface, and cloud instances respectively comprises at least one programmable data processor and memory storing instructions for execution by such at least one programmable data processor;
the messages from each respective cloud instance have different message types corresponding to the operating system used by such cloud instance or an application-level event;
the messaging interface queues the messages received from the cloud instances having different types in the message queue for retrieval and processing by the cloud orchestration framework.

2. The system of claim 1, wherein the messages comprise operating system level messages.

3. The system of claim 1, wherein the messages comprise application level messages.

4. The system of claim 1, wherein the cloud orchestration framework comprises a plurality of messaging workers which are configured to process the messages in the message queue in the messaging interface.

5. The system of claim 4, wherein there are a plurality of message queues providing redundant storage of messages for processing.

6. The system of claim 5, wherein at least a portion of the message queues are in computing systems that are geographically disperse.

7. The system of claim 5, wherein the cloud orchestration framework further comprises a cloud orchestration database for storing event related data generated by the messaging workers.

8. The system of claim 1, wherein at least one of the messaging agents comprise: an application programming interface (API) binding for the message queue.

9. A computer-implemented method comprising:
monitoring events at each of a plurality of cloud instances executing different types of operating systems, the cloud instances forming part of a multi-cloud computing environment;
transmitting, by respective messaging agents being executed by each of the cloud instances, event messages to a messaging interface, at least a portion of the event messages having different format types;
queueing, by the messaging interface, the messages in a single message queue forming part of the messaging interface; and
retrieving and processing, by a plurality of workers forming part of a cloud orchestration framework, the messages in the message queue.

10. The method of claim 9, wherein the events comprise: operating system level events.

11. The method of claim 9, wherein the events comprise: application level events.

12. The method of claim 9, wherein the cloud orchestration framework further comprises a cloud orchestration database for storing event related data generated by the messaging workers.

13. The method of claim 9, wherein there are a plurality of message queues providing redundant storage of messages for processing.

14. The method of claim 13, wherein at least a portion of the message queues are in computing systems that are geographically disperse.

15. The method of claim 9, wherein at least one of the messaging agents comprise: an application programming interface (API) binding for the message queue.

16. The method of claim 12, wherein the cloud orchestration framework further comprises a rules engine for triggering calls to external systems when specified by rules triggered by the events.

17. A system comprising:
at least one data processor; and
memory storing instructions which, when executed by the at least one data processor, result in operations comprising:
monitoring events at each of a plurality of cloud instances executing different types of operating systems, the cloud instances forming part of a multi-cloud computing environment;
transmitting, by respective messaging agents being executed by each of the cloud instances, event messages to a messaging interface, at least a portion of the event messages having different format types;
queueing, by the messaging interface, the messages in a single message queue forming part of the messaging interface; and
retrieving and processing, by a plurality of workers forming part of a cloud orchestration framework, the messages in the message queue.

18. The system of claim 17, wherein the events comprise: operating system level events and application level events.

19. The system of claim 17, wherein the cloud orchestration framework further comprises: a cloud orchestration database for storing event related data generated by the messaging workers, and a rules engine for triggering calls to external systems when specified by rules triggered by the events.

20. The system of claim 17, wherein at least one of the messaging agents comprise: an application programming interface (API) binding for the message queue.

* * * * *